(12) United States Patent
Cilfone et al.

(10) Patent No.: US 10,673,696 B2
(45) Date of Patent: Jun. 2, 2020

(54) DELEGATING DISPERSED STORAGE NETWORK CONFIGURATION CAPABILITIES WHILE PRESERVING OWNERSHIP CONSTRAINTS

(71) Applicant: International Business Machines Corporation, Armonk, NY (US)

(72) Inventors: Bart R. Cilfone, Marina del Rey, CA (US); Alan M. Frazier, Palatine, IL (US); Patrick A. Tamborski, Chicago, IL (US); Sanjaya Kumar, South Elgin, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 122 days.

(21) Appl. No.: 16/048,111

(22) Filed: Jul. 27, 2018

(65) Prior Publication Data
US 2020/0036587 A1    Jan. 30, 2020

(51) Int. Cl.
*H04L 12/24* (2006.01)
*H04L 29/08* (2006.01)

(52) U.S. Cl.
CPC ........ *H04L 41/0813* (2013.01); *H04L 41/084* (2013.01); *H04L 41/0856* (2013.01); *H04L 41/0866* (2013.01); *H04L 67/1097* (2013.01)

(58) Field of Classification Search
CPC ............. H04L 41/0813; H04L 41/0866; H04L 41/0856; H04L 41/084; H04L 67/1097
(Continued)

(56) References Cited

U.S. PATENT DOCUMENTS

| 5,414,812 A | * | 5/1995 | Filip ...................... G06F 9/465 707/694 |
| 9,940,055 B2 | * | 4/2018 | Schuepp ............ G05B 19/0428 |

(Continued)

FOREIGN PATENT DOCUMENTS

| EP | 0752652 A2 | * | 1/1997 | ............. G06F 9/468 |
| EP | 0752652 A2 |   | 1/1997 | |
| WO | 9724687 A1 |   | 7/1997 | |

OTHER PUBLICATIONS

Gu et at; Visual QoS Programming Environment for Ubiquitous Multimedia Services; IEEE International Conference on Multimedia and Expo, 2001, ICME 2001; Aug. 22-25, 2001; pp. 756-759.
(Continued)

*Primary Examiner* — Michael C Lai
(74) *Attorney, Agent, or Firm* — James Nock; Andrew D. Wright; Roberts Calderon Safran & Cole, P.C.

(57) ABSTRACT

A method includes delegating, by a managing unit of a dispersed storage network (DSN), authority to configure a sub-portion of at least a portion of the DSN managed by the managing unit to a designated entity according to one or more configuration constraints. The managing unit manages parent configuration data that contains a compilation of configuration changes made to the at least a portion of the DSN. The method further includes managing, by the designated entity, child configuration data that includes a compilation of configuration changes made to the sub-portion of the at least a portion of the DSN. The method further includes, when resolution of the child configuration data and the parent configuration data is triggered, determining whether the child configuration data is formatted in a manner consistent with formatting of the parent configuration data and, if so, incorporating the child configuration data into the parent configuration data.

12 Claims, 7 Drawing Sheets

(58) Field of Classification Search
USPC .................................................. 709/220, 221
See application file for complete search history.

(56) References Cited

U.S. PATENT DOCUMENTS

2006/0242183 A1* 10/2006 Niyogi ................ G06F 9/44505
2007/0038679 A1* 2/2007 Ramkumar ........... H04L 41/082
2018/0052671 A1* 2/2018 Venkatesan ............. G06F 21/10

OTHER PUBLICATIONS

Obelheiro et al.; Role-based access control for CORBA distributed object systems; Object-Oriented Real-Time Dependable Systems; IEEE Proceedings of the Seventh International Workshop (WORDS 2002); 2002; 8 pgs.
Wang et al.; On Hierarchical Configuration of Distributed Systems on Mesh and Hypercube; International Journal of Foundations of Computer Science 15.03; 2004: pp. 517-534.

* cited by examiner

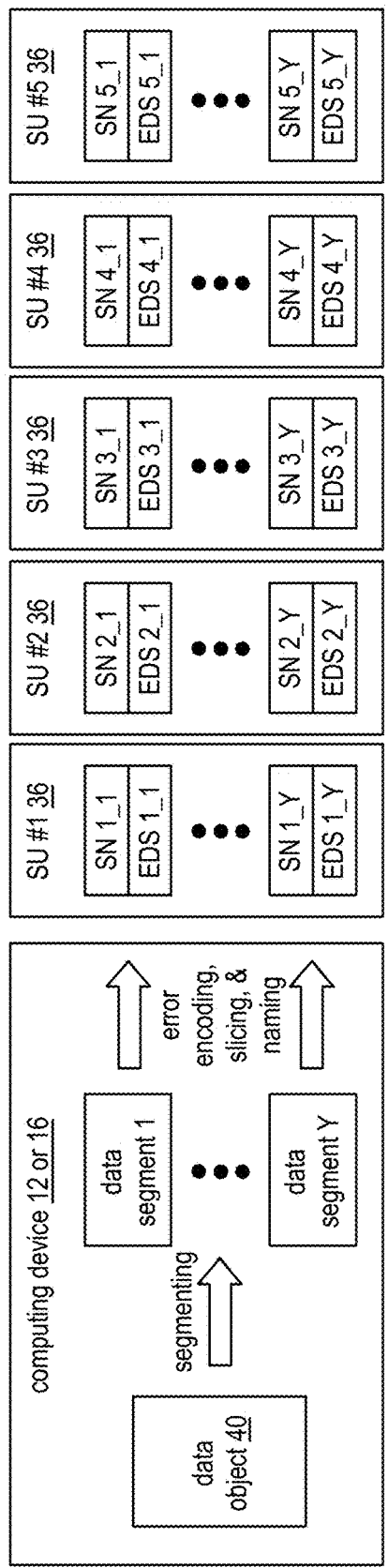
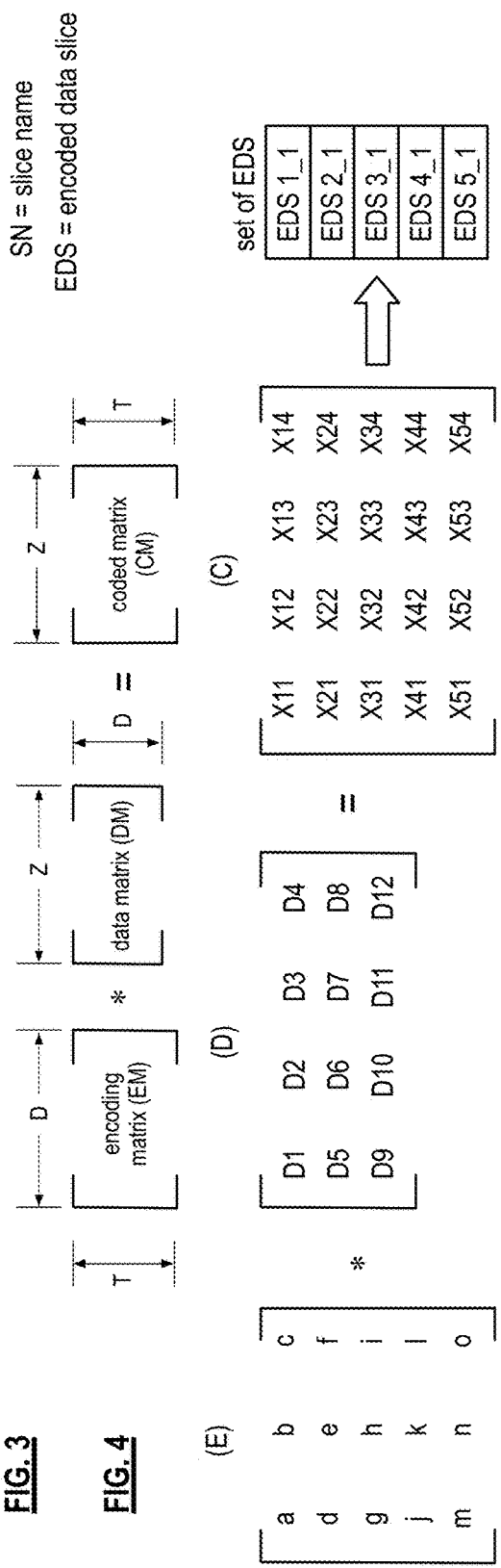

DELEGATING DISPERSED STORAGE NETWORK CONFIGURATION CAPABILITIES WHILE PRESERVING OWNERSHIP CONSTRAINTS

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

It is further known that a compilation of configuration changes made to an entire dispersed storage system is difficult and costly to maintain. For instance, upon an individual configuration change, the compilation would need to be regenerated and rewritten in its entirety.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
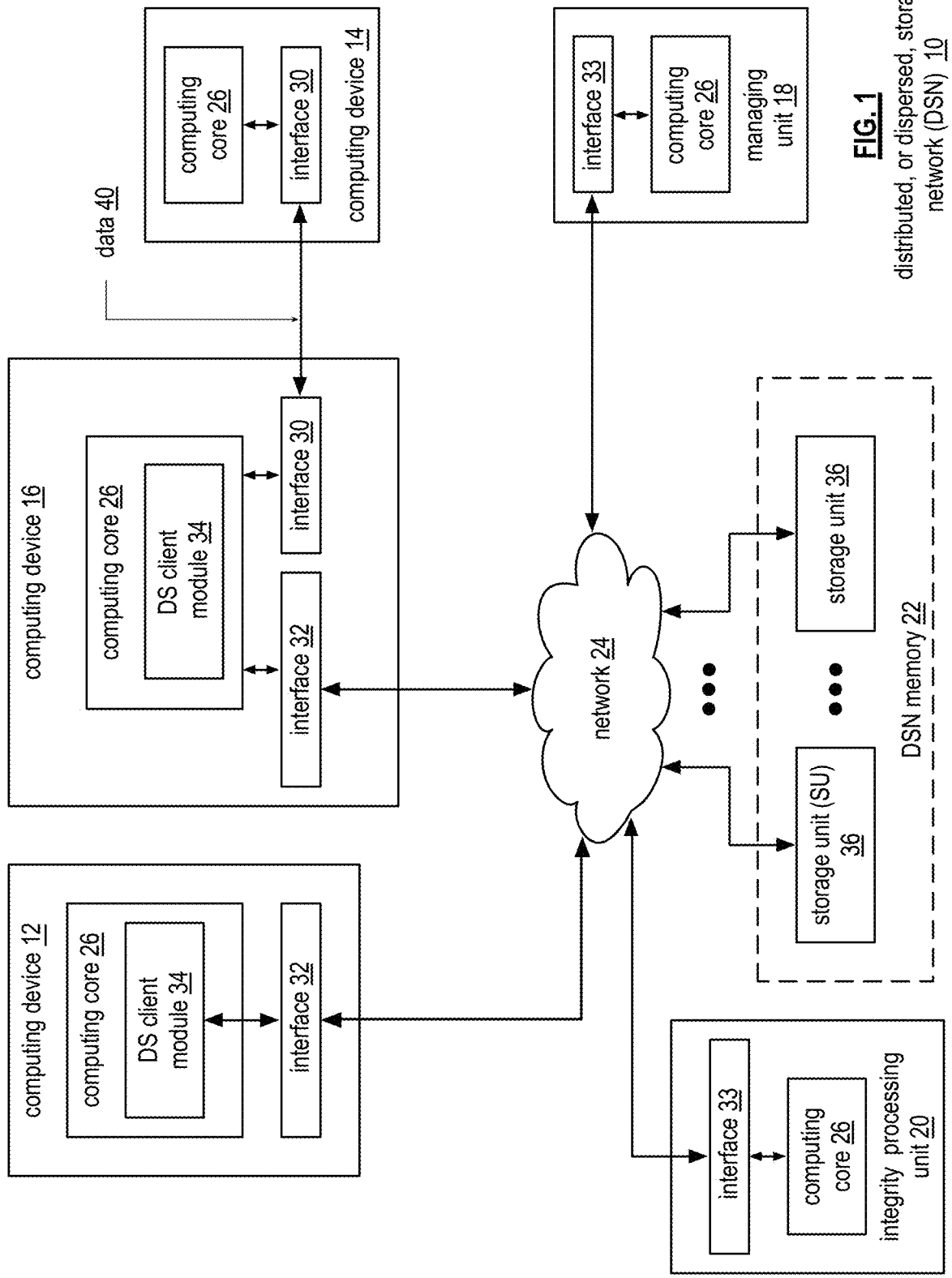
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
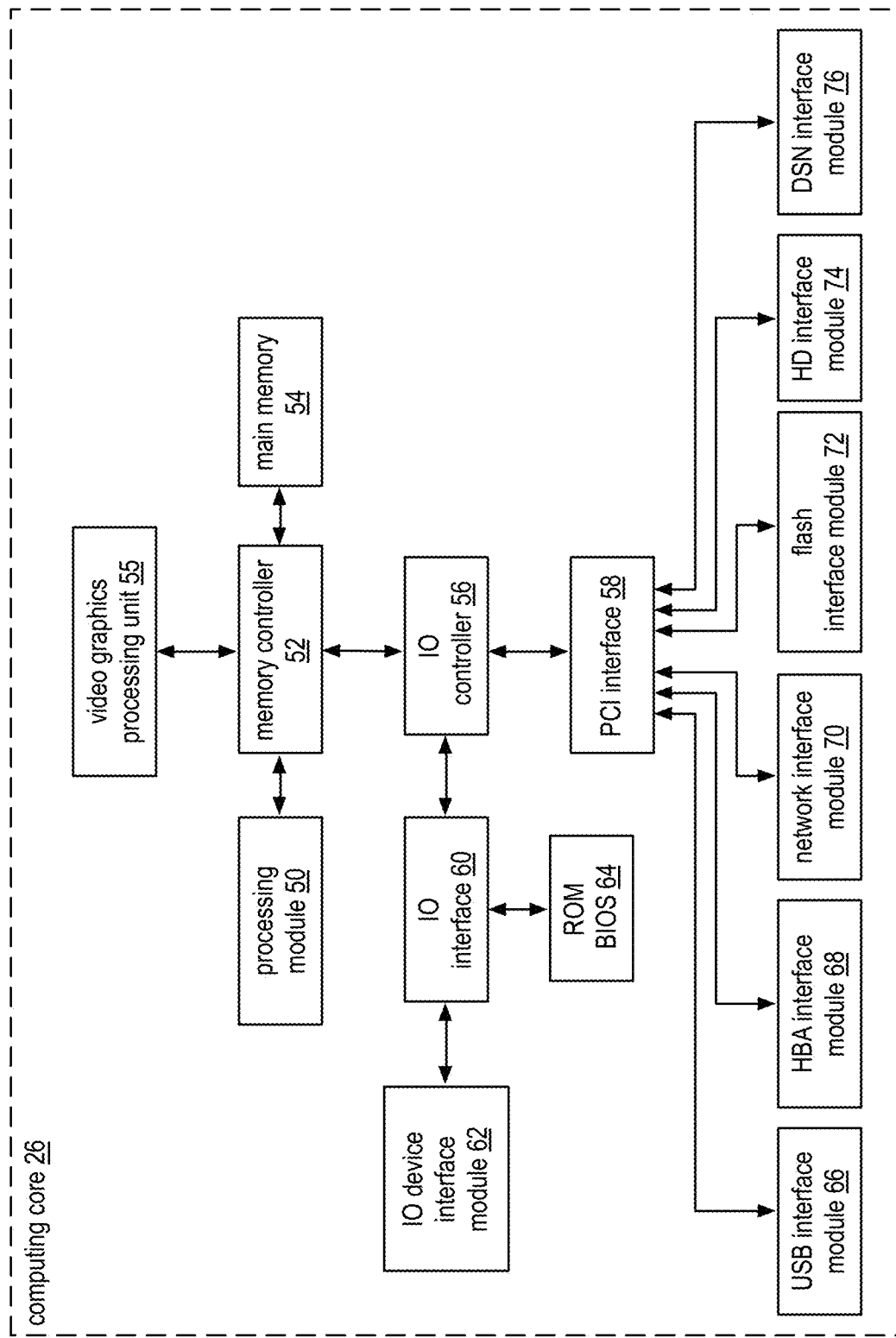
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
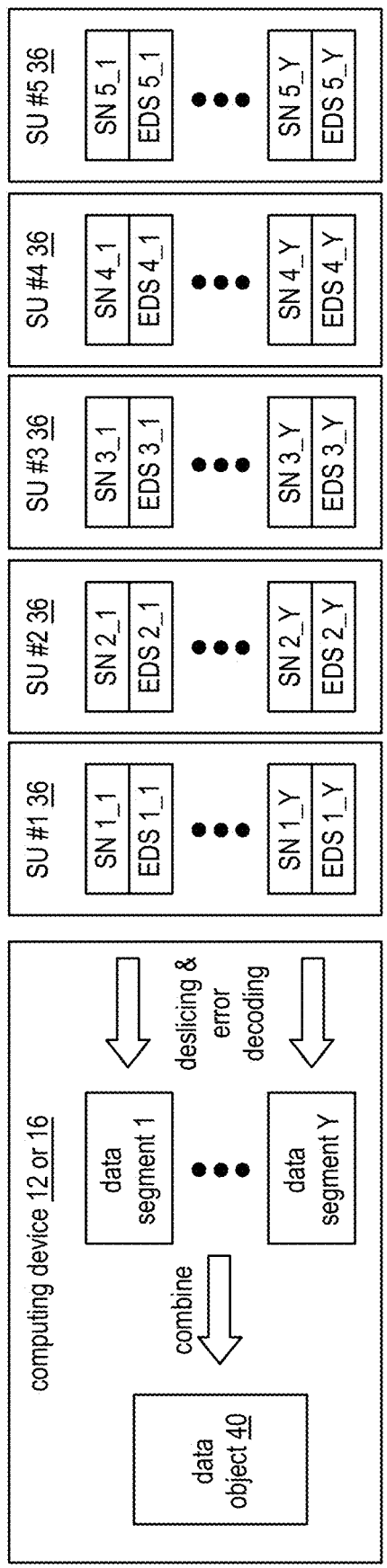
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
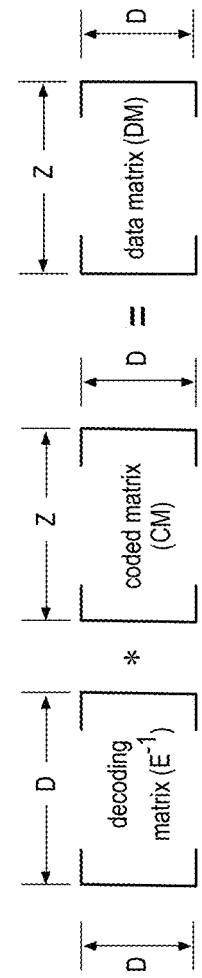
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
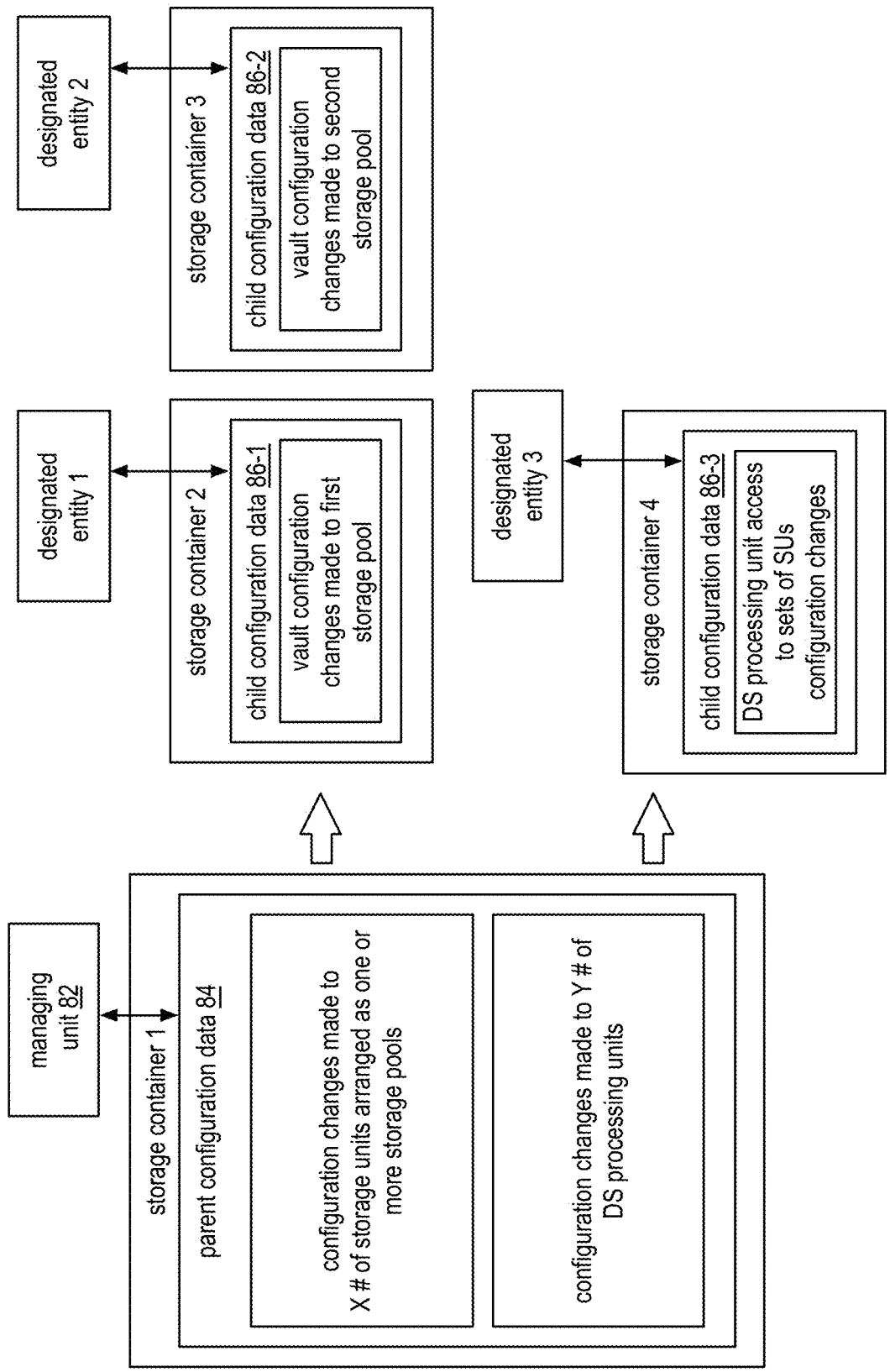
FIG. 9A is a schematic block diagram of another embodiment of the dispersed or distributed storage network (DSN) in accordance with the present invention.

FIG. 9A is a schematic block diagram of another embodiment of the dispersed or distributed storage network (DSN) that includes managing unit 82 (e.g., managing unit 18 of FIG. 1), designated entities 1-3, and storage containers 1-4. Designated entities 1-3 may be a company, person, or other entity of the DSN having varying access and ownership rights pertaining to the DSN. A storage container includes one or more sets of storage units of the DSN where the one or more sets of storage units support a plurality of logical storage vaults. A logical storage vault is a virtual memory space that maps to a set of storage units. For example, the one or more sets of storage units of storage container 1 support a plurality of logical storage vaults where the plurality logical storage vaults is affiliated with managing unit 82 such that the one or more sets of storage units of storage container 1 represent managing unit 82's DSN memory space. Further, the one or more sets of storage units of storage container 2 support a plurality of logical storage vaults where the plurality logical storage vaults is affiliated with designated entity 1 such that one or more sets of storage units of storage container 2 represent designated entity 1's DSN memory space. The one or more sets of storage units of storage container 3 support a plurality of logical storage vaults where the plurality logical storage vaults is affiliated with designated entity 2 such that one or more sets of storage units of storage container 3 represent designated entity 2's DSN memory space. The one or more sets of storage units of storage container 4 support a plurality of logical storage vaults where the plurality logical storage vaults is affiliated with designated entity 3 such that one or more sets of storage units of storage container 4 represent designated entity 3's DSN memory space. Each storage container 1-4 has access control lists (ACLs) allowing the corresponding affiliated designated entity to read/write object contents to the corresponding storage container.

The managing unit 82 manages at least a portion of the DSN and maintains parent configuration data 84. Parent configuration data 84 contains a compilation of configuration changes made to the portion of the DSN at a given point in time. Parent configuration data 84 may be represented in a structured document format (such as JSON) and stored on a filesystem or within a cloud object storage vault or a storage container. For example, parent configuration data 84 is stored on storage container 1 as shown in FIG. 9A.

In an example of operation, the portion of the DSN managed by managing unit 82 is X number of storage units arranged as one or more storage pools of the DSN and Y number of DS processing units of the DSN. Parent configuration data 84 contains a compilation of all configuration changes made to the X number of storage units arranged as one or more storage pools and the Y number of DS processing units. As shown in FIG. 9A, managing unit 82 delegates authority to configure one or more sub-portions of the portion of the DSN managed by the managing unit 82 to one or more designated entities according to one or more configuration constraints.

For example, managing unit 82 delegates authority to designated entity 1 to make vault configuration changes to a first storage pool of the one or more storage pools managed by the managing unit 82. Designated entity 1 manages child configuration data 86-1 which contains a compilation of all vault configuration changes made to the first storage pool. Child configuration data 86-1 is stored on storage container 2. Managing unit 82 delegates authority to designated entity 2 to make vault configuration changes to a second storage pool of the one or more storage pools managed by the managing unit 82. Designated entity 2 manages child configuration data 86-2 which contains a compilation of all vault configuration changes made to the second storage pool. Child configuration data 86-2 is stored on storage container 3. Managing unit 82 delegates authority to designated entity 3 to make configuration changes pertaining to the Y number of DS processing units' access to sets of storage units of the DSN. Designated entity 3 manages child configuration data 86-3 which contains a compilation of all configuration changes pertaining to the Y number of DS processing units' access to sets of storage units of the DSN. Child configuration data 86-3 is stored on storage container 4. Parent configuration data 84 includes the child configuration data 86-1 through 86-3 directly and/or by reference to designated entities 1-3 and/or or their child configuration data 86-1 through 86-3 (e.g., upon resolution of parent and child configuration data).

Managing unit 82 may further delegate authority to designated entities 1-3 or one or more other designated entities to make a variety of other configuration changes to sub-portions of the portion of the DSN managed by the managing unit 82. For instance, configuration changes pertaining to DS error encoding per set of storage units of the X number of storage units, configuration changes pertaining to the number of sets of storage units per pool of the one or more storage pools, and a multiple other configuration changes may be delegated to one or more designated entities.

Thus, parent configuration data 84 is divided into logical subsections where each subsection represents different configurable entities or sets of entities throughout the system. This division is done so that as the configuration is changed incrementally. The parent configuration document/data, which may grow large over time, does not need to be regenerated and rewritten in its entirety for every individual configuration change. The parent configuration data 84 structure includes the ability to reference the designated entities and/or their child configuration data with context and to place contextual limits on the capabilities of those referenced child configuration documents/data. This allows for configuration data/documents to be owned and maintained by different security parties (i.e., designated entities) with a parent-child relationship, where the parent can enforce constraints on the nature of the configuration allowed by the child and the child cannot do anything to escape the bounds of these constraints.

Figure 9B:
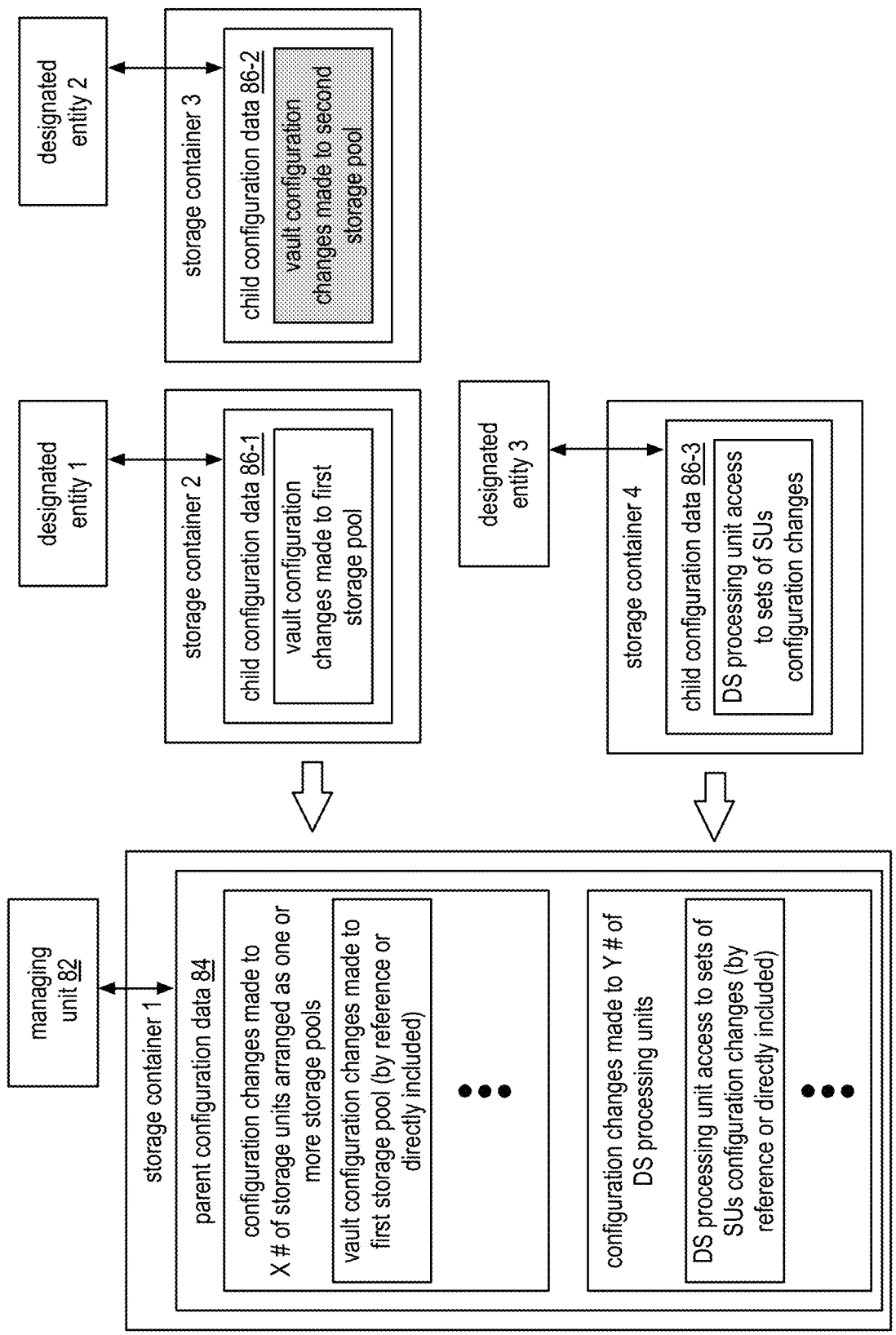
FIG. 9B is a schematic block diagram of another embodiment of the dispersed or distributed storage network (DSN) in accordance with the present invention.

FIG. 9B is a schematic block diagram of another embodiment of the dispersed or distributed storage network (DSN) that includes managing unit 82 (e.g., managing unit 18 of FIG. 1), designated entities 1-3, and storage containers 1-4 of FIG. 9A.

When resolution of the child configuration data 86-1 through 86-3 and the parent configuration data 84 is triggered, managing unit 82 determines whether the child configuration data 86-1 through 86-3 is formatted in a manner consistent with formatting of the parent configuration data 84. The resolution of the child configuration data 86-1 through 86-3 and the parent configuration data 84 is triggered by one or more of expiration of a time period, an amount of configuration changes made by the designated entities 1-3, and execution of a task relating to the portion of the DSN managed by the managing unit 82. For example, a user initiating a data access request pertaining to a set of storage units managed by the managing unit 82 triggers resolution of the parent and child configuration data.

Determining whether the child configuration data 86-1 through 86-3 is formatted in a manner consistent with formatting of the parent configuration data 84 includes determining whether the designated entity is using a proper editor application to make the configuration changes to the child configuration data and whether the configuration changes made to the child configuration data are in accordance with current configuration constraints. For example, the managing unit 82 delegates complete authority to designated entity 2 to make vault configuration changes to a second storage pool. While designated entity 2 must abide by these constraints it is possible for designated entity 2 to use an improper editor application (e.g., a plain text editor) to modify child configuration data 86-2 in ways which violate the constraints specified by the parent configuration data 84. Further, the constraints of the parent configuration data 84 may change over time such that child configuration data 86-2, which satisfied the constraints at one point in time, may not satisfy the constraints after they are changed in the parent configuration data 84. For example, designated entity 2 may have had authority to make vault configuration changes to the first and the second storage pool at one point in time but those constraints were adjusted such that designated entity 2 now only has authority to make vault configuration changes to the second storage pool. The managing unit 82 checks for any of these formatting issues upon resolution.

In the example shown, child configuration data 86-1 and 86-3 are formatted in a manner consistent with formatting of the parent configuration data 84 and are incorporated into the parent configuration data 84 either by reference or directly. However, child configuration data 86-2 is not formatted in a manner consistent with formatting of the parent configuration data 84 (as indicated by shading). For example, child configuration data 86-2 includes vault configuration changes made to the first storage pool by designated entity 2 (i.e., changes made under an old constraint).

Managing unit 82 may choose to ignore any format inconsistencies between child configuration data 86-2 and parent configuration data 84 and incorporate the child configuration data 86-2 into parent configuration data 84 minus the format inconsistencies or reject child configuration data 86-2 from incorporation entirely. In this example, managing unit 82 chose to entirely reject child configuration data 86-2 from incorporation into the parent configuration data 84. However, if managing unit 82 chose to ignore format inconsistencies, any vault configuration changes made to the first storage pool by designated entity 2 in child configuration data 86-2 would be ignored but vault configuration changes made to the second storage pool by designated entity 2 in in child configuration data 86-2 would be incorporated into parent configuration data 84.

This model allows for an administrator to setup the initial root configuration (i.e., parent configuration) and delegate a subset of the configuration capabilities to a separate party/designated entity without allowing that party/designated entity access to modify the root configuration, thereby allowing flexibility in ongoing configuration of the DSN while not jeopardizing the root configuration from a security perspective. From a machine perspective (rather than human administrator), this also allows a secured machine such as a managing unit 82 to delegate portions of configuration responsibility to other nodes while at the same time limiting the risk of such delegation through security constraints. For example, a fully authorized primary managing unit 82 may delegate responsibility for vault ACLs on a given vault over to a separate DS unit which can then manage those vault ACLs directly without needing real time interaction with the primary management unit.

Figure 10:
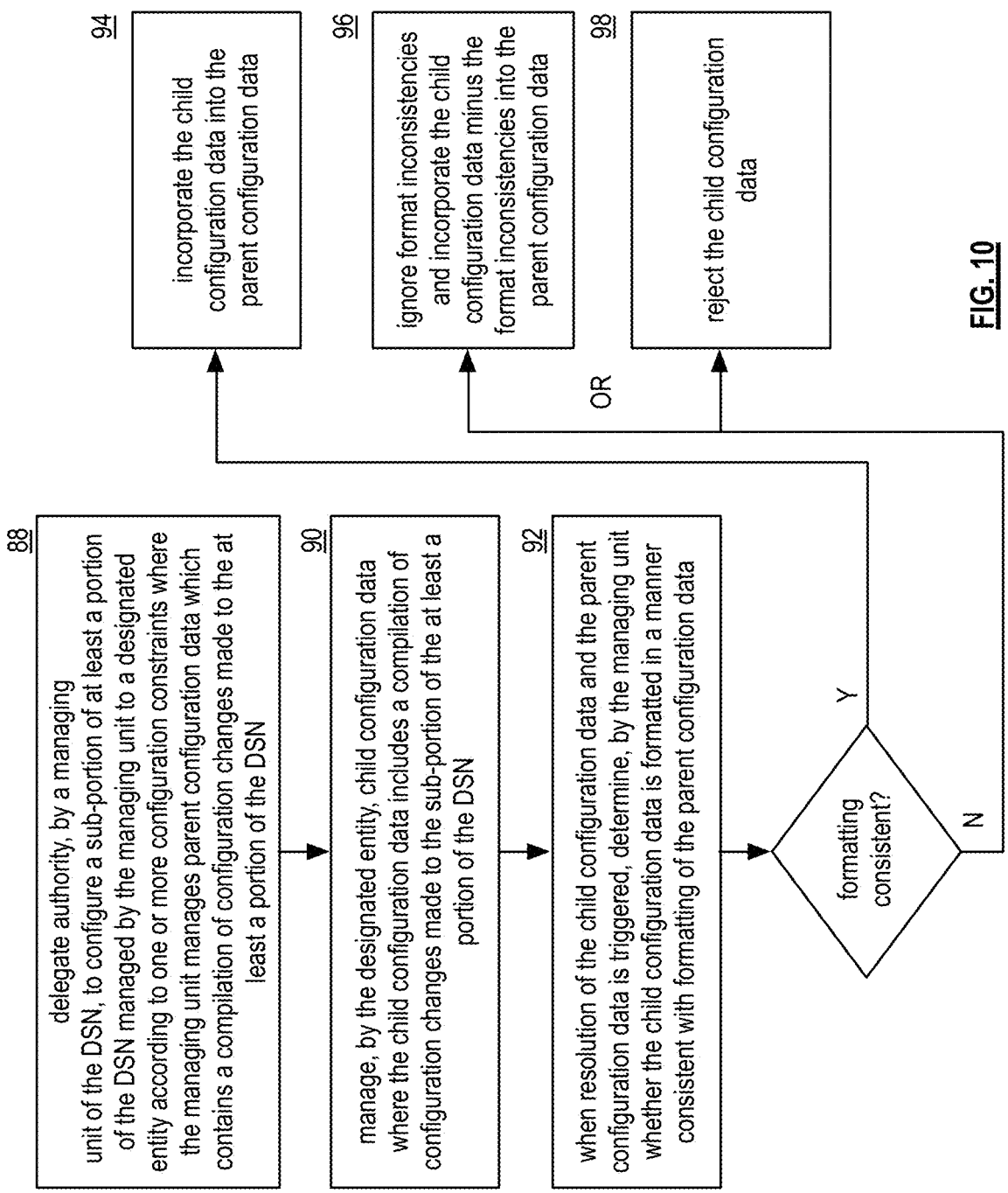
FIG. 10 is a logic diagram of an example of a method of delegating dispersed storage network (DSN) configuration capabilities in accordance with the present invention.

FIG. 10 is a logic diagram of an example of a method of delegating dispersed storage network (DSN) configuration. The method begins with step 88 where a managing unit of a dispersed storage network (DSN) delegates authority to configure a sub-portion of at least a portion of the DSN managed by the managing unit to a designated entity of the DSN according to one or more configuration constraints. The managing unit manages parent configuration data. The parent configuration data contains a compilation of configuration changes made to the at least a portion of the DSN. A designated entity may be a company, person, or other entity of the DSN having varying access and ownership rights pertaining to the DSN. Parent configuration data may be represented in a structured document format (such as JSON) and stored on a filesystem or within a cloud object storage vault or a storage container. A storage container has access control lists (ACLs) allowing the corresponding affiliated designated entity to read/write object contents to the corresponding storage container.

The method continues at step 90 where the designated entity manages child configuration data. The child configuration data includes a compilation of configuration changes made to the sub-portion of the at least a portion of the DSN. When the parent configuration data is stored in a first storage container, the child configuration data may be stored in a second storage container of the DSN.

Thus, the parent configuration data is divided into logical subsections where each subsection represents different configurable entities or sets of entities throughout the system. This division is done so that as the configuration is changed incrementally. The parent configuration document/data, which may grow large over time, does not need to be regenerated and rewritten in its entirety for every individual configuration change. The parent configuration data structure includes the ability to reference the designated entities and/or their child configuration data with context and to place contextual limits on the capabilities of those referenced child configuration documents/data. This allows for configuration data/documents to be owned and maintained by different security parties (i.e., designated entities) with a parent-child relationship, where the parent can enforce constraints on the nature of the configuration allowed by the child and the child cannot do anything to escape the bounds of these constraints.

As an example, the managing unit manages dispersed storage (DS) units and storage pools of the DSN and delegates authority to the designated entity to make vault configuration changes to a first storage pool of the storage pools managed by the managing unit. The designated entity manages child configuration data which contains a compilation of all vault configuration changes made to the first storage pool. The managing unit may further delegate authority to configure a second sub-portion of the at least a portion of the DSN to a second designated entity of the DSN according to one or more second configuration constraints. The second designated entity then manages second child configuration data, where the second child configuration data includes a compilation of configuration changes made to the second sub-portion of the at least a portion of the DSN. When the child configuration data is stored in a second storage container, the second child configuration data is stored in a third storage container where the second storage container has a second access control list that includes the designated entity and the third storage container has a third access control list that includes the second designated entity.

The method continues with step 92, where when resolution of the child configuration data and the parent configuration data is triggered, the managing unit determines whether the child configuration data is formatted in a manner consistent with formatting of the parent configuration data. The resolution of the child configuration data and the parent configuration data is triggered by one or more of expiration of a time period, an amount of configuration changes made by the designated entity, and execution of a task relating to the portion of the DSN managed by the managing unit. For example, a user initiating a data access request pertaining to a set of storage units managed by the managing unit triggers resolution of the parent and child configuration data.

Determining whether the child configuration data is formatted in a manner consistent with formatting of the parent configuration data includes determining whether the designated entity is using a proper editor application to make the configuration changes to the child configuration data and whether the configuration changes made to the child configuration data are in accordance with current configuration constraints. For example, the managing unit delegates complete authority to the designated entity to make vault configuration changes to a first storage pool. While the designated entity must abide by these constraints it is possible for designated entity to use an improper editor application (e.g., a plain text editor) to modify the child configuration data in ways which violate the constraints specified by the parent configuration data. Further, the constraints of the parent configuration data may change over time such that child configuration data which satisfied the constraints at one point in time may not satisfy the constraints after they are changed in the parent configuration data. For example, the designated entity may have had authority to make vault configuration changes to the first and a second storage pool at one point in time but those constraints were adjusted such that the designated entity now only has authority to make vault configuration changes to the first storage pool. The managing unit checks for any of these formatting issues upon resolution.

When the child configuration data is formatted in a manner consistent with formatting of the parent configuration data, the method continues to step 94 where the child configuration data is incorporated into the parent configuration data.

When the child configuration data is not formatted in a manner consistent with formatting of the parent configuration data, the method continues with steps 96 or 98 (based on an implementation detail). When the method continues with step 96, the managing unit chooses to ignore any format inconsistencies between child configuration data and parent configuration data and incorporate the child configuration data into parent configuration data minus the format inconsistencies. For instance, using the example above, any vault configuration changes made to the second storage pool by the designated entity in child configuration data would be ignored but vault configuration changes made to the first storage pool by the designated entity in in child configuration data would be incorporated into parent configuration data.

Alternatively, when the method continues with step 98, the managing unit chooses to entirely reject child configuration data when the child configuration data is not formatted in a manner consistent with formatting of the parent configuration data. Using the example above, if child configuration data includes vault configuration changes made to the second storage pool by the designated entity (e.g., changes made under an old constraint), the managing unit rejects child configuration data entirely from inclusion in parent configuration data.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/− 1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:
1. A method comprises:
 delegating, by a managing unit of a dispersed storage network (DSN), authority to configure a sub-portion of at least a portion of the DSN managed by the managing unit to a designated entity of the DSN according to one or more configuration constraints, wherein the managing unit manages parent configuration data, wherein the parent configuration data contains a compilation of configuration changes made to the at least a portion of the DSN, and wherein the parent configuration data is stored in a first storage container of the DSN;

managing, by the designated entity, child configuration data, wherein the child configuration data includes a compilation of configuration changes made to the sub-portion of the at least a portion of the DSN, wherein the child configuration data is stored in a second storage container of the DSN;

when resolution of the child configuration data and the parent configuration data is triggered: determining, by the managing unit, whether the child configuration data is formatted in a manner consistent with formatting of the parent configuration data; and when the child configuration data is formatted in the manner consistent with formatting of the parent configuration data:

incorporating, by the managing unit, the child configuration data into the parent configuration data.

2. The method of claim 1 further comprises:

when the child configuration data is not formatted in the manner consistent with formatting of the parent configuration data, ignoring, by the managing unit, format inconsistencies between the parent configuration data and the child configuration data; and incorporating, by the managing unit, the child configuration data into the parent configuration data minus the format inconsistencies.

3. The method of claim 1 further comprises:

when the child configuration data is not formatted in the manner consistent with formatting of the parent configuration data, rejecting, by the managing unit, the child configuration data from inclusion in the parent configuration data.

4. The method of claim 1 further comprises:

delegating, by the managing unit, authority to configure a second sub-portion of the at least a portion of the DSN to a second designated entity of the DSN according to one or more second configuration constraints; and managing, by the second designated entity, second child configuration data, wherein the second child configuration data includes a compilation of configuration changes made to the second sub-portion of the at least a portion of the DSN, wherein the second child configuration data is stored in a third storage container of the DSN, and wherein the second storage container has a second access control list that includes the designated entity and the third storage container has a third access control list that includes the second designated entity.

5. The method of claim 1, wherein the resolution of the child configuration data and the parent configuration data is triggered by one or more of: expiration of a time period, an amount of configuration changes made by the designated entity, and execution of a task relating to the at least a portion of the DSN managed by the managing unit.

6. The method of claim 1, wherein the at least a portion of the DSN includes dispersed storage units and storage pools of the DSN, wherein the sub-portion of the at least a portion of the DSN includes a first storage pool of the storage pools of the DSN, and wherein the one or more configuration constraints include vault configuration.

7. A computer readable memory comprises:

a first memory element that stores operational instructions that, when executed by a managing unit of a dispersed storage network (DSN), causes the managing unit to:

delegate authority to configure a sub-portion of at least a portion of the DSN managed by the managing unit to a designated entity of the DSN according to one or more configuration constraints, wherein the managing unit manages parent configuration data, wherein the parent configuration data contains a compilation of configuration changes made to the at least a portion of the DSN, and wherein the parent configuration data is stored in a first storage container of the DSN;

a second memory element that stores operational instructions that, when executed by the designated entity, causes the designated entity to:

manage child configuration data, wherein the child configuration data includes a compilation of configuration changes made to the sub-portion of the at least a portion of the DSN, wherein the child configuration data is stored in a second storage container of the DSN; and a third memory element that stores operational instructions that, when executed by the managing unit, causes the managing unit to:

when resolution of the child configuration data and the parent configuration data is triggered:

determine whether the child configuration data is formatted in a manner consistent with formatting of the parent configuration data; and when the child configuration data is formatted in the manner consistent with formatting of the parent configuration data:

incorporate the child configuration data into the parent configuration data.

8. The computer readable memory of claim 7, wherein the third memory element further stores operational instructions that, when executed by the managing unit, causes the managing unit to:

when the child configuration data is not formatted in the manner consistent with formatting of the parent configuration data, ignore format inconsistencies between the parent configuration data and the child configuration data; and incorporate the child configuration data into the parent configuration data minus the format inconsistencies.

9. The computer readable memory of claim 7, wherein the third memory element further stores operational instructions that, when executed by the managing unit, causes the managing unit to:

when the child configuration data is not formatted in the manner consistent with formatting of the parent configuration data, reject the child configuration data from inclusion in the parent configuration data.

10. The computer readable memory of claim 7 further comprises:

a fourth memory element that stores operational instructions that, when executed by the managing unit, causes the managing unit to:

delegate authority to configure a second sub-portion of the at least a portion of the DSN to a second designated entity of the DSN according to one or more second configuration constraints; and a fifth memory element that stores operational instructions that, when executed by the second designated entity, causes the second designated entity to:

manage second child configuration data, wherein the second child configuration data includes a compilation of configuration changes made to the second sub-portion of the at least a portion of the DSN, wherein the second child configuration data is stored in a third storage container of the DSN, and wherein the second storage container has a second access control list that includes the designated entity and the third storage container has a third access control list that includes the second designated entity.

11. The computer readable memory of claim 7, wherein the resolution of the child configuration data and the parent configuration data is triggered by one or more of: expiration of a time period, an amount of configuration changes made by the designated entity, and execution of a task relating to the at least a portion of the DSN managed by the managing unit.

12. The computer readable memory of claim 7, wherein the at least a portion of the DSN includes dispersed storage units and storage pools of the DSN, wherein the sub-portion of the at least a portion of the DSN includes a first storage pool of the storage pools of the DSN, and wherein the one or more configuration constraints include vault configuration.

* * * * *